United States Patent
Morimoto (10) Patent No.: US 11,156,466 B2
(45) Date of Patent: Oct. 26, 2021

(54) LANE DETERMINATION DEVICE (71) Applicant: Toyota Jidosha Kabushiki Kaisha, Toyota (JP)

(72) Inventor: Shuichi Morimoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 236 days.

(21) Appl. No.: 16/426,499

(22) Filed: May 30, 2019

(65) Prior Publication Data

US 2020/0049516 A1    Feb. 13, 2020

(30) Foreign Application Priority Data

Aug. 9, 2018  (JP) .............................. JP2018-150134

(51) Int. Cl.
*G01C 21/34* (2006.01)
*G05D 1/02* (2020.01)
*G05D 1/00* (2006.01)

(52) U.S. Cl.
CPC ....... *G01C 21/3407* (2013.01); *G05D 1/0088* (2013.01); *G05D 1/0278* (2013.01); *G05D 2201/0212* (2013.01)

(58) Field of Classification Search
CPC ............ G01C 21/3407; G01C 21/3453; G05D 1/0278; G05D 1/0088; G05D 2201/0212; B60W 40/06
See application file for complete search history.

(56) References Cited

U.S. PATENT DOCUMENTS

2017/0371337 A1* 12/2017 Ramasamy ............ G01C 21/32
2018/0237018 A1*  8/2018 Goto .................. G01C 21/3658

FOREIGN PATENT DOCUMENTS

JP          2017-132422 A     8/2017

* cited by examiner

*Primary Examiner* — Marthe Y Marc-Coleman
(74) *Attorney, Agent, or Firm* — Dinsmore & Shohl LLP (57) ABSTRACT

A lane determination device includes a processor configured to: store map information including information on division lines defining two lanes on a road; calculate a first angle and a second angle based on the map information, the first angle being a bending angle of a first division line at a junction where the two lanes merge together, the second angle being a bending angle of a second division line at the junction, the first division line being one of two outermost division lines in the division lines defining the two lanes, the second division line being the other one of the two outermost division lines; and determine, as a merging lane, a lane defined by the second division line out of the two lanes when the first angle is larger than the second angle.

5 Claims, 6 Drawing Sheets

LANE DETERMINATION DEVICE

CROSS-REFERENCE TO RELATED APPLICATIONS

This application claims priority to Japanese Patent Application No. 2018-150134 filed on Aug. 9, 2018, which is incorporated herein by reference in its entirety including the specification, drawings and abstract.

BACKGROUND

1. Technical Field

The disclosure relates to a lane determination device.

2. Description of Related Art

For example, Japanese Unexamined Patent Application Publication No. 2017-132422 (JP 2017-132422 A) describes an automatic driving vehicle that automatically travels. In such an automatic driving vehicle, it is preferable not to make a lane change as much as possible so as to reduce uncomfortable feeling to be given to an occupant.

SUMMARY

For example, in a road with two lanes, one of the two lanes may merge into the other one of the two lanes via a non-lane zone. In a case where a vehicle travels on a lane (a merging lane) to be reduced in such a road, it is necessary that the vehicle makes a lane change when the vehicle reaches a junction. For example, it is conceivable that a lane to be reduced is determined based on an image captured by a camera. However, it is necessary to approach the junction within a distance within which the camera can capture an image of the junction, and it is difficult to determine a lane to be reduced in advance.

The present disclosure provides a technique to determine a lane to be reduced in advance in a road where two lanes merge together via a non-lane zone.

A lane reduction determination device according to a first aspect of the disclosure includes a processor configured to: store map information including information on division lines defining two lanes on a road; calculate a first angle and a second angle based on the map information, the first angle being a bending angle of a first division line at a junction where the two lanes, merge together, the second angle being a bending angle of a second division line at the junction, the first division line being one of two outermost division lines in the division lines defining the two lanes, the second division line being the other one of the two outermost division lines; and determine, as a merging lane, a lane defined by the second division line out of the two lanes when the first angle is larger than the second angle.

A lane reduction determination device according to a second aspect of the disclosure includes a processor configured to: store map information including information on division lines defining two lanes on the road and information on an arrow marking on a road which indicates a traveling direction of a vehicle merging at a junction where the two lanes merge together; extract, based on the map information, information on an arrow marking provided between the junction and a point distanced from the junction by a predetermined distance in a predetermined direction, the predetermined direction being a direction from the junction toward the two lanes; extract, based on the map information, information on two division lines defining a lane where the arrow marking is present; and determine, as a merging lane, a lane defined by an outside division line and a central division line when an arrow of the arrow marking, the information of which is extracted by the processor, is directed from the outside division line to the central division line, the central division line being a division line provided between the two lanes out of the two division lines, the outside division line being the other one of the two division lines.

With the above aspects of the disclosure, it is possible to determine a lane to be reduced in advance on a road where lanes merge together via a non-lane zone.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the disclosure will be described with reference to the drawings. Note that the same elements in the description of the drawings have the same reference sign and redundant description thereof is omitted.

First Embodiment

Figure 1:
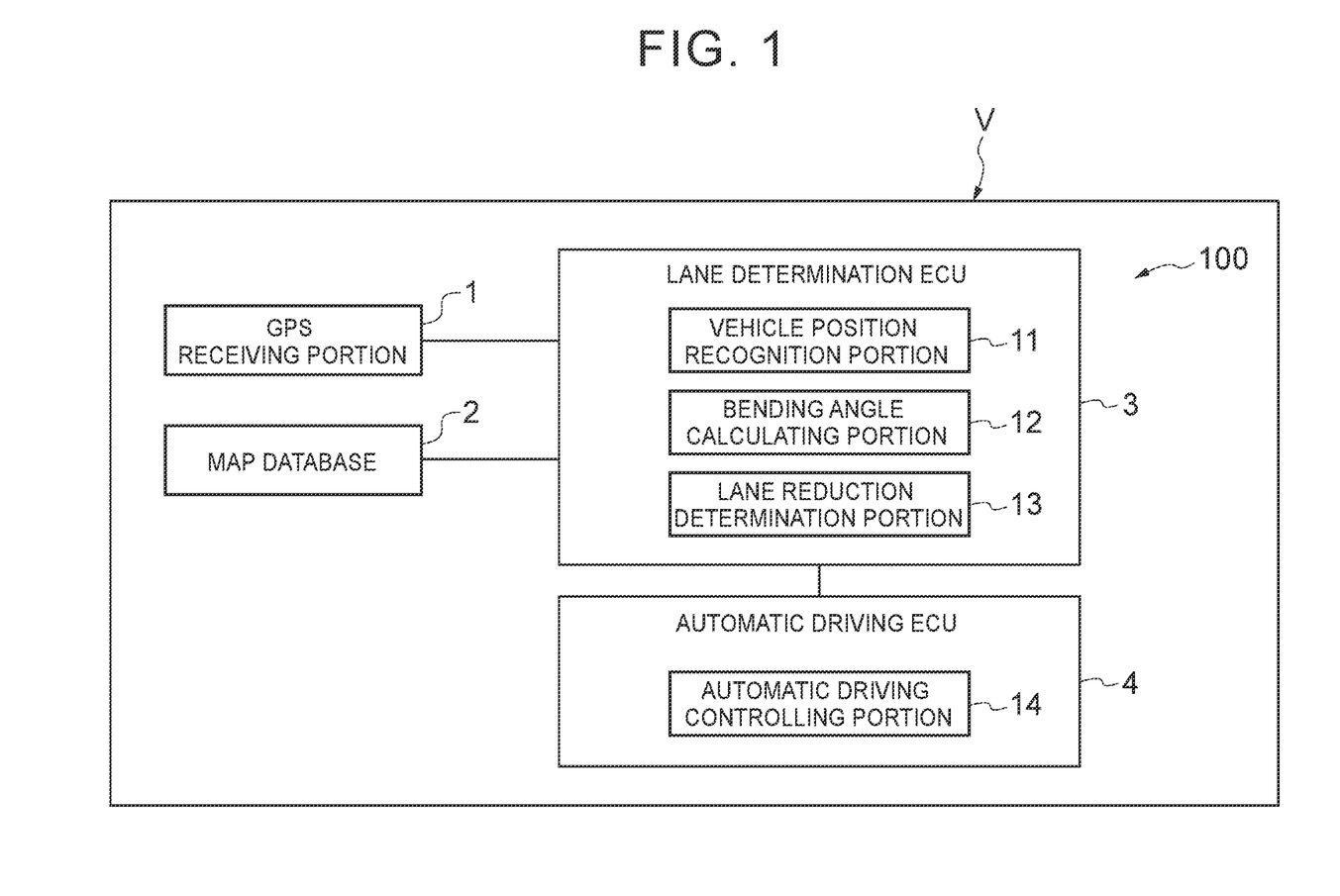
FIG. 1 is a view illustrating a schematic configuration of a lane reduction determination device according to a first embodiment.

First described is a first embodiment of a lane reduction determination device. As illustrated in FIG. 1, a lane reduction determination device 100 is provided in a vehicle V such as a passenger car. The lane reduction determination device 100 determines which lane is a lane to be reduced (a merging lane) in a road where two lanes merge together at a junction via a non-lane zone and one of the lanes is reduced. The lane reduction determination device 100 determines a lane to be reduced M terms of a junction ahead of the vehicle V. In the present embodiment, a lane reduction determination result in the lane reduction determination device 100 is used for an automatic driving control on the vehicle V.

Figure 2:
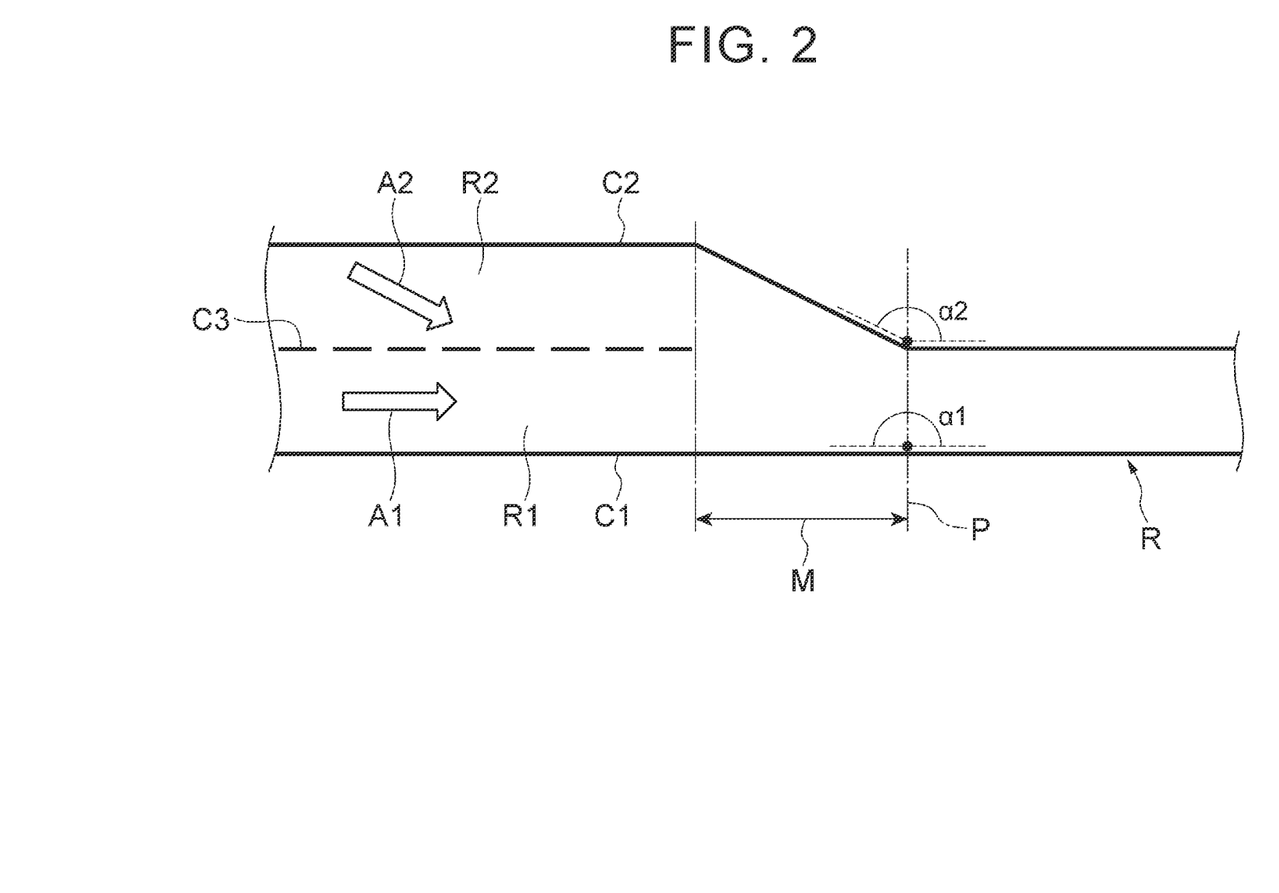
FIG. 2 is a view illustrating a bending angle of a division line in a road where two lanes merge together at a junction.

More specifically, there is a road R where a lane R1 and a lane R2 merge together at a junction P, for example, as illustrated in FIG. 2. The road R is a road on which the vehicle V travels from left to right in FIG. 2. The lane R2 in the road R is a lane (a lane that does not exist after the junction, a merging lane) that is reduced by merging. The lane R1 is a lane that continues without being reduced by merging. Division lines C1 and C2 are provided on the road R. The lane R1 and the lane R2 are sectioned by a division line C3 indicated by broken lines. The lane R2 merges into the lane R1 via a non-lane zone M where the division line C3 is not provided. That is, in the road R, the lane R2 merges into the lane R1 at the junction P via the non-lane zone M, so that the number of lanes is reduced (the lane R2 comes to an end). For example, the lane reduction determination device 100 determines the lane R2 to be reduced by merging, out of the lane R1 and the lane R2, in terms of the road R illustrated in FIG. 2.

Note that the junction P is a point where merging is completed when the lane R2 merges into the lane R1. Further, the non-lane zone M is a zone where two lanes merge into one lane and therefore no division line that sections the two lanes from each other is provided. A distance between the division line C1 and the division line C2 is a distance corresponding to two lanes (a width corresponding to the lanes R1 and R2) before the non-lane zone M in the travel direction of the vehicle V on the road R. The distance is gradually narrowed in the non-lane zone M and becomes a distance corresponding to one lane (a width corresponding to the lane R1) after the junction P. Further, road surface arrow markings A1 and A2 are provided on the lanes R1 and R2, respectively. The road surface arrow markings A1 and A2 each indicate, by the direction of the arrow, a travelling direction for the vehicle V at the time of merging at the junction P.

As illustrated in FIG. 1, the lane reduction determination device 100 includes a lane determination electronic control unit (ECU) 3 configured to generally manage the device. The lane determination ECU 3 is an electronic control unit including a central processing unit (CPU), a read only memory (ROM), a random access memory (RAM), and so on. The lane determination ECU 3 loads a program stored in the ROM to the RAM and implements various functions by executing the program loaded in the RAM by the CPU. The lane determination ECU 3 may be constituted by a plurality of electronic control units.

A GPS receiving portion 1 and a map database (a map information storage portion) 2 are connected to the lane determination ECU 3.

The GPS receiving portion 1 measures a position of the vehicle V (e.g., latitude and longitude of the vehicle V) by receiving signals from three or more GPS satellites. The GPS receiving portion 1 transmits measured positional information of the vehicle V to the lane determination ECU 3.

The map database 2 is a database in which map information is stored. The map database 2 is formed in a storage device such as a hard disk drive (HDD) provided in the vehicle V. The map information includes positional information on roads, information on road shapes (e.g., types such as a curve and a linear part, a curvature of a curve, and the like), positional information on intersections and branch points, speed limits set on roads, positional information on fixed obstacles such as poles, and so on. Note that the map database 2 may be provided in a computer in a facility such as an information processing center communicable with the vehicle V.

Further, the map information includes information on a division line of a lane. The information on a division line of a lane is information that can specify the position and shape of the division line. Note that a division line of a lane is a line (e.g., a white line) sectioning the lane from a region other than the lane.

Next will be described a functional configuration of the lane determination ECU 3. The lane determination ECU 3 includes a vehicle position recognition portion 11, a bending angle calculating portion 12, and a lane reduction determination portion 13. Some functions of the lane determination ECU 3 may be performed by a server or the like communicable with the vehicle V.

The vehicle position recognition portion 11 recognizes a position of the vehicle V on the map based on the positional information of the GPS receiving portion 1 and the map information of the map database 2. Further, the vehicle position recognition portion 11 recognizes the position of the vehicle V by a simultaneous localization and mapping (SLAM) technology by use of the positional information on fixed obstacles such as poles, included in the map information of the map database 2, and a detection result of an external sensor configured to detect, an outside circumference of the vehicle V. The vehicle position recognition portion 11 may recognize the position of the vehicle V on the map by other well-known techniques.

The bending angle calculating portion 12 acquires information on division lines at a junction ahead of the vehicle V based on the recognized position of the vehicle V and the map information. Here, the junction ahead of the vehicle V is a junction present at a position within a predetermined distance ahead of the vehicle V. Further, the junction used here is a junction at which two lanes merge together via a non-lane zone and one of the lanes is reduced. The bending angle calculating portion 12 calculates, based on the acquired information on the division lines, a right bending angle that is a bending angle of a right division line, in the travelling direction, of a lane at the junction and a left bending angle that is a bending angle of a left division line, in the travelling direction, of the lane at the junction.

More specifically, it is assumed that the vehicle V travels on the road R illustrated in FIG. 2 from the left side in FIG. 2 toward the junction P, for example. In this case, the bending angle calculating portion 12 calculates a right bending angle $\alpha 1$ as a bending angle of the right division line C1, in the travelling direction, of the lane at the junction P. The bending angle calculating portion 12 employs, as the right bending angle $\alpha 1$, an angle that is not more than 180° from bending angles of the division line C1 at the junction P. The right bending angle $\alpha 1$ is a positive value. Further, the bending angle calculating portion 12 calculates a left bending angle $\alpha 2$ as a bending angle of the left division line C2, in the travelling direction, of the lane at the junction P. The bending angle calculating portion 12 employs, as the left bending angle $\alpha 2$, an angle that is not more than 180° from bending angles of the division line C2 at the junction P. The left bending angle $\alpha 2$ is a positive value.

The lane reduction determination portion 13 determines a lane to be reduced out of two lanes merging together at the junction via the non-lane zone, based on the right bending angle and the left bending angle calculated by the bending angle calculating portion 12. More specifically, when the right bending angle is larger than the left bending angle, the lane reduction determination portion 13 determines that the left lane heading toward the junction, out of the two lanes merging together at the junction, is the lane to be reduced. Further, when the left bending angle is larger than the right bending angle, the lane reduction determination portion 13 determines that the right lane heading toward the junction, out of the two lanes merging together at the junction, is the lane to be reduced.

For example, in the road R illustrated in FIG. 2, the right bending angle $\alpha 1$ is larger than the left bending angle $\alpha 2$. On this account, the lane reduction determination portion 13 determines that the left lane R2 heading toward the junction P, out of the lanes R1 and R2 merging together at the junction P via the non-lane zone M, is the lane to be reduced.

Note that, at the time of determining a magnitude relationship between the right bending angle and the left bending angle, the lane reduction determination portion 13 may determine whether or not a difference between those two angles is a predetermined division-line angle threshold or more. More specifically, when the right bending angle is larger than the left bending angle by the division-line angle threshold or more, the lane reduction determination portion 13 may determine that the left lane heading toward the junction, out of the two lanes merging together at the junction, is the lane to be reduced. Similarly, when the left bending angle is larger than the right bending angle by the division-line angle threshold or more, the lane reduction determination portion 13 may determine that the right lane heading toward the junction, out of the two lanes merging together at the junction, is the lane to be reduced.

An automatic driving ECU 4 is connected to the lane determination ECU 3 of the lane reduction determination device 100. The automatic driving ECU 4 is an electronic control unit including a CPU and so on, similarly to the lane determination ECU 3. Note that the automatic driving ECU 4 may be provided integrally with the lane determination ECU 3. The automatic driving ECU 4 includes an automatic driving controlling portion 14 in terms of function.

The automatic driving controlling portion 14 performs an automatic driving control in the vehicle V. The automatic driving controlling portion 14 can perform the automatic driving control in the vehicle V by a well-known method. In the present embodiment, the automatic driving controlling portion 14 controls the travel of the vehicle V based on a determination result of the lane reduction determination portion 13. For example, in a case where a junction at which two lanes merge together via a non lane zone and one of the lanes is reduced is present ahead of the vehicle V the automatic driving controlling portion 14 may control a driving lane of the vehicle V so that the vehicle V travels to avoid the lane to be reduced. In this case, the vehicle V travels to avoid the lane to be reduced, so the automatic driving controlling portion 14 can restrain lane-changing of the vehicle V at the junction.

Figure 3:
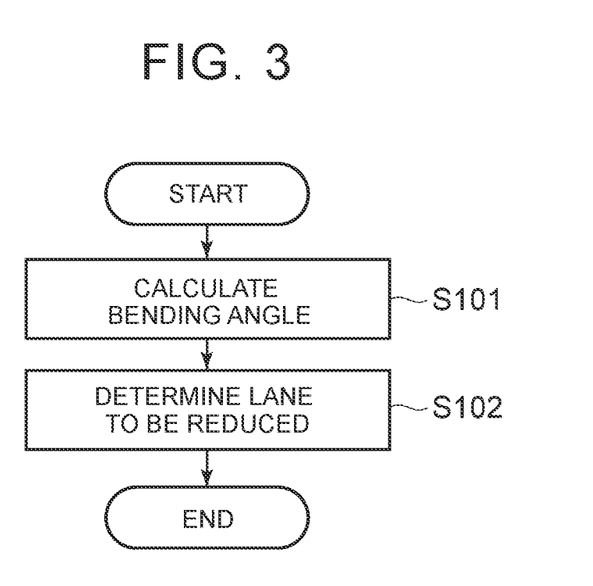
FIG. 3 is a flowchart illustrating the procedure of a lane reduction determination process.

Next will be described the procedure of a lane reduction determination process performed by the lane reduction determination device 100, with reference to the flowchart of FIG. 3. Note that the lane reduction determination process illustrated in FIG. 3 is started in a case where a junction at which two lanes merge together via a non-lane zone and one of the lanes is reduced is present ahead of the vehicle V. Whether there is the junction or not can be determined by the bending angle calculating portion 12 based on a recognized position of the vehicle V and the map information.

When the lane reduction determination process is started, the bending angle calculating portion 12 calculates a right bending angle and a left bending angle of division lines at the junction based on the recognized position of the vehicle V and the map information (S101). The lane reduction determination portion 13 determines a lane to be reduced from two lanes merging together at the junction via the non-lane zone, based on the right bending angle and the left bending angle thus calculated (S102).

As described above, the lane reduction determination device 100 determines the lane to be reduced from the two lanes merging together via the non-lane zone, based on the information on the division lines that is included in the map information. That is, the lane reduction determination device 100 can determine, in advance, the lane to be reduced based on the map information without waiting until the vehicle V approaches the junction at a position where an image of the lane at the junction can be captured by a camera or the like. As such, the lane reduction determination device 100 can determine, in advance, a lane to be reduced in a road where lanes merge together via a non-lane zone, by use of information on division lines that is included in the map information.

As described above, at the time of determining a magnitude relationship between the right bending angle and the left bending angle, the lane reduction determination portion 13 may determine whether or not a difference between those two angles is a predetermined division-line angle threshold or more. In this case, the lane reduction determination device 100 can restrain a false determination and can determine the lane to be reduced more accurately.

Second Embodiment

Figure 4:
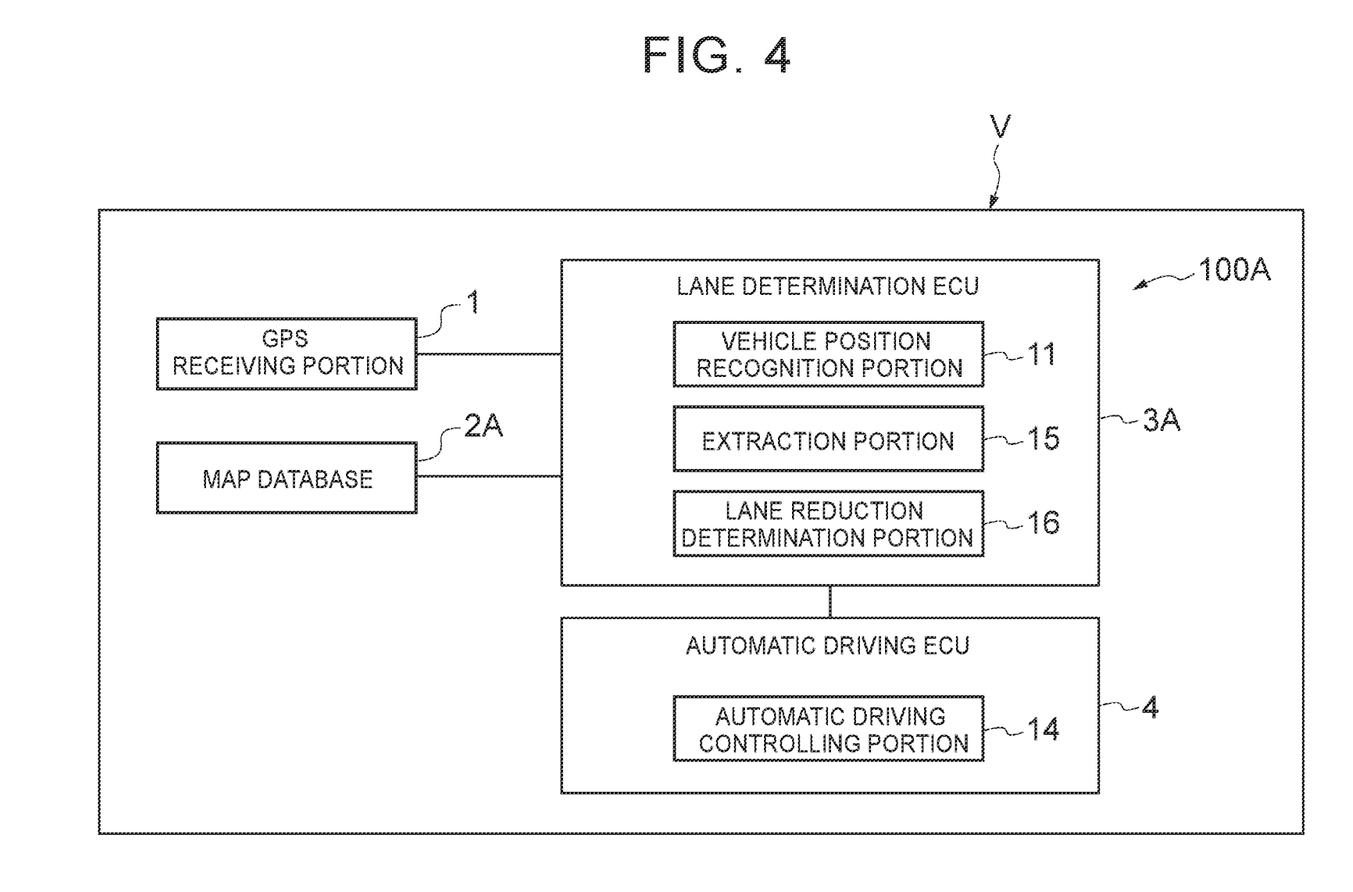
FIG. 4 is a view illustrating a schematic configuration of a lane reduction determination device according to a second embodiment.

Next will be described a second embodiment of the lane reduction determination device. In the following description, a constituent similar to a constituent in the first embodiment has the same reference sign as in the first embodiment, and a detailed description thereof is omitted. As illustrated in FIG. 4, a lane reduction determination device 100A determines a lane to be reduced in a road where two lanes merge together at a junction via a non-lane zone and one of the lanes is reduced. The lane reduction determination device 100A determines a lane to be reduced in terms of a junction ahead of the vehicle V.

The lane reduction determination device 100A includes a lane determination ECU 3A. Similarly to the lane determination ECU 3 in the first embodiment, the lane determination ECU 3A is an electronic control unit including a CPU and so on. The GPS receiving portion 1 and a map database (a map information storage portion) 2A are connected to the lane determination ECU 3A.

The map database 2A is a database in which map information is stored. The map database 2A is formed in a storage device such as a hard disk drive (HDD) provided in the vehicle V. The map information includes positional information on roads, information on road shapes (e.g., types such as a curve and a linear part, a curvature of a curve, and the like), positional information on intersections and branch points, speed limits set on roads, positional information of fixed obstacles such as poles, and so on. Note that the map database 2A may be provided in a computer in a facility such as an information processing center communicable with the vehicle V.

Further, the map information includes information on a division line of a lane and information on a road surface arrow marking. The information on a division line of a lane is information that can specify the position and shape of the division line. Note that a division line of a lane is a line (e.g., a white line) sectioning the lane from a region other than the lane.

Figure 5:
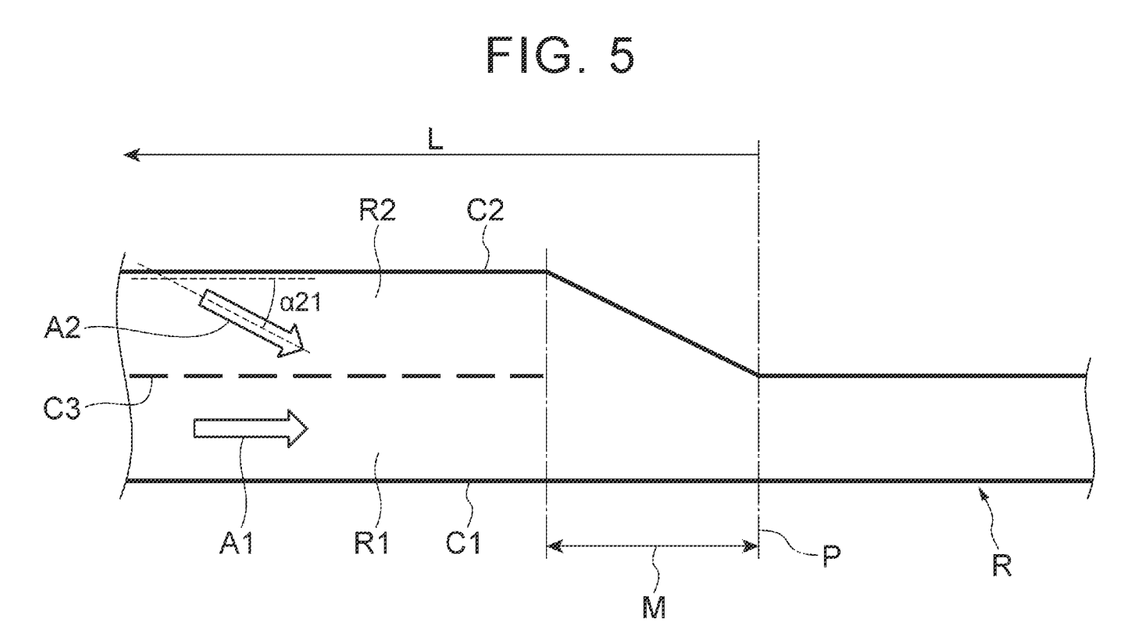
FIG. 5 is a view illustrating an angle of an inclination of a road surface arrow marking from a division line in a road where two lanes merge together at a junction.

A road surface arrow marking is a marking indicative of a travelling direction for the vehicle V at the time of merging at a junction. The information on a road surface arrow marking is information that can specify the position of the road surface arrow marking and a direction of an arrow. For example, as illustrated in FIG. 5, the road surface arrow markings A1 and A2 are provided on the lanes R1 and R2, respectively, at a position on the near side from the junction P. In a case where the vehicle V travels on the lane R2, it is necessary for the vehicle V to move toward the lane R1 side from the lane R2 at the junction P. On this account, the arrow of the road surface arrow marking A2 is directed toward the lane R1 side. That is, the direction of the arrow of the road surface arrow marking A2 is inclined toward the right side from the extending direction of the division lines C2 and C3.

In the meantime, in a case where the vehicle V travels on the lane R1, even if the vehicle V reaches the junction P, the vehicle V keeps traveling along the lane R1. On this account, the road surface arrow marking A1 is directed toward a side along the extending direction of the lane R1. That is, the direction of the arrow of the road surface arrow marking A1 is not inclined from the extending direction of the division lines C1 and C3. For example, information of the road surface arrow markings A1 and A2 includes information that can specify respective positions where the road surface arrow markings A1 and A2 are provided and the directions of the arrows of the road surface arrow markings A1 and A2, as illustrated in FIG. 5.

Next will be described a functional configuration of the lane determination ECU 3A. The lane determination ECU 3A includes the vehicle position recognition portion 11, an extraction portion 15, and a lane reduction determination portion 16. Some functions of the lane determination ECU 3A may be performed by a server or the like communicable with the vehicle V.

Based on the position of the vehicle V, recognized by the vehicle position recognition portion 11, and the map information, the extraction portion 15 extracts information on a road surface arrow marking provided between a junction present ahead of the vehicle V and a point on the near side (the vehicle V side) from the junction by a predetermined reference distance. Further, the extraction portion 15 extracts information on division lines of a lane including the road surface arrow marking the information of which is extracted. Here, the junction ahead of the vehicle V is a junction present at a position within a predetermined distance ahead of the vehicle V. Further, the junction used here is a junction at which two lanes merge together via a non-lane zone and one of the lanes is reduced. Further, regardless of the lane on which the vehicle V travels, the extraction portion 15 extracts respective pieces of information on road surface arrow markings provided on the two lanes heading toward the junction.

More specifically, it is assumed that the vehicle V travels on the road R illustrated in FIG. 5 front the left side in FIG. 5 toward the junction P, for example. In this case, the extraction portion 15 extracts, based on the map information, pieces of information on the road surface arrow markings A1 and A2 provided between the junction P and a point on the near side from the junction P by a predetermined reference distance L. Further, the extraction portion 15 extracts information on division lines (the division lines C1 and C3) of the lane R1 (the lane R1 where the road surface arrow marking A1 is provided) including the road surface arrow marking A1 the information of which is extracted. Further, the extraction portion 15 extracts information on division lines (the division lines C2 and C3) of the lane R2 (the lane R2 where the road surface arrow marking A2 is provided) including the road surface arrow marking A2 the information of which is extracted.

The lane reduction determination portion 16 determines a lane to be reduced from two lanes merging together at the junction via the non-lane zone, based on inclinations (inclinations from the division lines) of the road surface arrow markings the information of which is extracted by the extraction portion 15. More specifically, in a case where the direction of the arrow of the road surface arrow marking the information of which is extracted by the extraction portion 15 is inclined toward the right side from the extending direction of the division lines the information of which is extracted by the extraction portion 15, the lane reduction determination portion 16 determines that the left lane out of the two lanes heading toward the junction is the lane to be reduced. Further, in a case where the direction of the arrow of the road surface arrow marking the information of which is extracted by the extraction portion 15 is inclined toward the left side from the extending direction of the division lines the information of which is extracted by the extraction portion 15, the lane reduction determination portion 16 determines that the right lane out of the two lanes heading toward the junction is the lane to be reduced.

For example, in the road R illustrated in FIG. 5, the direction of the arrow of the road surface arrow marking A2 provided on the lane R2 is inclined by an angle $\alpha 21$ from the division line C2 so as to be directed toward the lane R1 side. As such, since the direction of the arrow of the road surface arrow marking A2 is inclined to the right side from the extending direction of the division line C2 (the division line C3), the lane reduction determination portion 16 determines that the left lane R2 heading toward the junction P, out of the lanes R1 and R2 merging together at the junction P via the non-lane zone M, is the lane to be reduced.

Note that, at the time of determining the direction of the arrow of the road surface arrow marking from the extending direction of the division line, the lane reduction determination portion 16 may determine whether or not an angle formed by the arrow and the extending direction of the division line is a predetermined arrow angle threshold or more. More specifically, in a case where the direction of the arrow of the road surface arrow marking the information of which is extracted by the extraction portion 15 is inclined toward the right side by the predetermined arrow angle threshold or more from the extending direction of the division line the information of which is extracted by the extraction portion 15, the lane reduction determination portion 16 may determine that the left lane out of the two lanes heading toward the junction is the lane to be reduced. Similarly, in a case where the direction of the arrow of the road surface arrow marking the information of which is extracted by the extraction portion 15 is inclined toward the left side by the predetermined arrow angle threshold or more from the extending direction of the division line the information of which is extracted by the extraction portion 15, the lane reduction determination portion 16 may determine that the right lane out of the two lanes heading toward the junction is the lane to be reduced.

Further, the lane reduction determination portion 16 may determine the lane to be reduced based on the direction of the arrow of the road surface arrow marking that is not inclined from the extending direction of the division line, like the road surface arrow marking A1 illustrated in FIG. 5. Namely, this is a case where the direction of the arrow of the road surface arrow marking is parallel with the extending direction of the division line. More specifically, in a case where the direction of the arrow of the road surface arrow marking the information of which is extracted by the extraction portion 15 is not inclined from the extending direction of the division line the information of which is extracted by the extraction portion 15, the lane reduction determination portion 16 may determine that a lane other than the lane including the road surface arrow marking is the lane to be reduced. Note that the case where the direction of the arrow of the road surface arrow marking is not inclined from the extending direction of the division line may include a case where an angle formed between the direction of the arrow of the road surface arrow marking and the extending direction of the division line is a predetermined angle or less, in addition to a ease where the direction of the arrow of the road surface arrow marking is parallel with the extending direction of the division line.

For example, in the road R illustrated in FIG. 5, the direction of the arrow of the road surface arrow marking A1 provided on the lane R1 is not inclined from the extending direction of the division line C1 (the division line C3). Since the direction of the arrow of the road surface arrow marking A1 is not inclined from the extending direction of the division line C1 (the division line C3) as such, the lane reduction determination portion 16 determines that the lane R2 other than the lane R1 including the road surface arrow marking A1 is the lane to be reduced.

The determination result in the lane reduction determination device 100A is used in the automatic driving control by the automatic driving controlling portion 14, similarly to the first embodiment.

Figure 6:
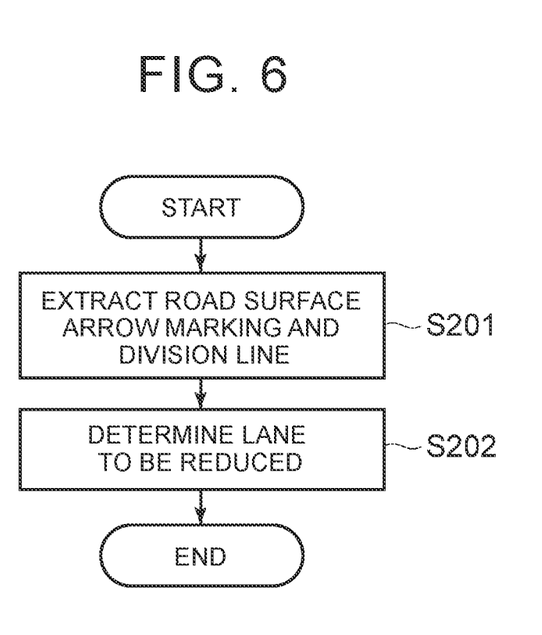
FIG. 6 is a flowchart illustrating the procedure of a lane reduction determination process.

Next will be described the procedure of a lane reduction determination process performed by the lane reduction determination device 100A, with reference to the flowchart of FIG. 6. Note that the lane reduction determination process illustrated in FIG. 6 is started in a case where a junction at which two lanes merge together via a non-lane zone and one of the lanes is reduced is present ahead of the vehicle V. Whether the junction is present or not can be determined by the extraction portion 15 based on a recognized position of the vehicle V and the map information.

When the lane reduction determination process is started, the extraction portion 15 extracts information on a road surface arrow marking provided between the junction and a point on the near side from the junction by the reference distance L and information on division lines (S201). The lane reduction determination portion 16 determines a lane to be reduced from two lanes merging together at the junction via the non-lane zone, based on an inclination (an inclination from a division line) of the road surface arrow marking the information of which is extracted (S202).

As described above, the lane reduction determination device 100A determines the lane to be reduced from the two lanes merging together via the non-lane zone, based on the information on the division lines of the lane and the information on the road surface arrow marking, included in the map information. That is, the lane reduction determination device 100A can determine, in advance, the lane to be reduced based on the map information without waiting until the vehicle approaches the junction at a position where an image of the lane at the junction can be captured by a camera or the like. As such, the lane reduction determination device 100A can determine, in advance, a lane to be reduced in a road where lanes merge together via a non-lane zone, by use of information on division lines of lanes and information on road surface arrow markings, included in the map information.

As described above, at the time of determining the direction of the arrow of the road surface arrow marking from the extending direction of the division line, the lane reduction determination portion 16 may determine whether or not an angle formed by the arrow and tire extending direction of the division line is a predetermined arrow angle threshold or more. In this case, the lane reduction determination device 100A can restrain a false determination and can determine the lane to be reduced more accurately.

The embodiments of the disclosure have been described as above, but the disclosure is not limited to the above embodiments. For example, the lane reduction determination device may perform the lane reduction determination in the first embodiment and the lane reduction determination in the second embodiment at the same time. In a case where these two lane reduction determinations have different determination results, for example, the lane reduction determination device may prioritize the lane reduction determination result in the second embodiment over the lane reduction determination result in the first embodiment.

The determination result in the lane reduction determination device 100 or 100A is not limited to being used in a driving lane control in the automatic driving control by the automatic driving controlling portion 14. This determination result may be used for purposes other than the driving lane control in the automatic driving control and may be used for purposes other than the automatic driving control.

The lane reduction determination device 100 or 100A may not be provided in the vehicle V. Further, a target junction to be subjected to the determination on the lane to be reduced is not limited to a junction ahead of the vehicle V. For example, the lane reduction determination device may be provided in an information processing center or the like other than the vehicle V, and a lane to be reduced at a junction may be determined based on the map information.

Note that the map information may include information on a center line of a lane. In this case, the lane reduction determination device may determine a lane to be reduced based on a change of an angle of the center line of the lane before and after merging at a junction where two lanes merge together and one of the lanes is reduced. For example, the lane reduction determination device may determine, as a lane that is not reduced, a lane in Which an angle of the center line of the lane is not changed before and after merging, out of the two lanes heading toward the junction, and the lane reduction determination device may determine, as a lane to be reduced, a lane in which an angle of the center line of the lane is changed before and after merging.

Further, there is a case where a road surface arrow marking is provided only in a lane to be reduced at a junction where two lanes merge together and one of the lanes is reduced. Namely, that is a case where only the road surface arrow marking A2 is provided in the example illustrated in FIG. 5. In this case, the lane reduction determination device may extract information on the road surface arrow marking based on the map information and determine, as a lane to be reduced, a lane on which the road surface arrow marking is provided out of two lanes heading toward the junction.

Further, there is a case where, at a junction where two lanes merge together and one of the lanes is reduced, a lane reduction marking indicating that the number of lames is reduced is provided only in a lane to be reduced. More specifically, there is a case where the lane reduction marking is provided only in one of a right shoulder edge and a left shoulder edge of a road with the two lanes heading toward the junction. In this case, the lane reduction determination device extracts information (positional information on the lane reduction marking) on the lane reduction marking provided on the near side from the junction based on the map information. Then, based on whether the position where the lane reduction marking is provided is the right shoulder edge or the left shoulder edge of the road, the lane reduction determination device may determine a lane where the lane reduction marking is provided, as a lane to be reduced.

A lane reduction determination device according to a first aspect of the disclosure includes a processor configured to: store map information including information on division lines defining two lanes on a road; calculate a first angle and a second angle based on the map information, the first angle being a bending angle of a first division line at a junction where the two lanes merge together, the second angle being a bending angle of a second division line at the junction, the first division line being one of two outermost division lines in the division lines defining the two lanes, the second division line being the other one of the two outermost division lines; and determine, as a merging lane, a lane defined by the second division line out of the two lanes when the first angle is larger than the second angle.

In the above aspect, the lane determination device determines a lane to be reduced from the two lanes merging together via the non-lane zone, based on the information on the division lines, included in the map information. That is, the lane determination device can determine, in advance, the lane to be reduced based on the map information without waiting until the vehicle approaches the junction at a position where an image of the lane at the junction can be captured by a camera or the like. As such, the lane determination device can determine, in advance, a lane to be reduced on a road where two lanes merge together via a non-lane zone, by use of information on division lines, included in the map information.

In the above aspect, the processor may be configured to determine, as the merging lane, a lane defined by the second division line out of the two lanes when the first angle is larger than the second angle and a difference between the first angle and the second angle is equal to or greater than a predetermined value.

With the above configuration, the lane reduction determination device can restrain a false determination and can determine the lane to be reduced more accurately.

In the above aspect, the processor may be configured to: employ, as the first angle, an angle equal to or less than 180 degrees from bending angles of the first division line at the junction and employ, as the second angle, an angle equal to or less than 180 degrees from bending angles of the second division line at the junction.

In the above aspect, the processor may be configured to output a result of determining.

A lane reduction determination device according to a second aspect of the disclosure includes a processor configured to: store map information including information on division lines defining two lanes on the road and information on an arrow marking on a road which indicates a traveling direction of a vehicle merging at a junction where the two lanes merge together; extract, based on the map information, information on an arrow marking provided between the junction and a point distanced from the junction by a predetermined distance in a predetermined direction, the predetermined direction being a direction from the junction toward the two lanes; extract, based on the map information, information on two division lines defining a lane where the arrow marking is present; and determine, as a merging lane, a lane defined by an outside division line and a central division line when an arrow of the arrow marking, the information of which is extracted by the processor, is directed from the outside division line to the central division line, the central division line being a division line provided between the two lanes out of the two division lines, the outside division line being the other one of the two division lines.

In the above aspect, the lane reduction determination device determines a lane to be reduced from the two lanes merging together via the non-lane zone, based on the information on the division lines of the lanes and the information on the road surface arrow marking, included in, the map information. That is, the lane reduction determination device can determine, in advance, the lane to be reduced based on the map information without waiting until the vehicle approaches the junction at a position where an image of the lane at the junction can be captured by a camera or the like. As such, the lane reduction determination device can determine, in advance, a lane to be reduced on a road where lanes merge together via a non-lane zone, by use of information on division lines of the lanes and information on a road surface arrow marking, included in the map information.

In the above aspect, the processor may be configured to determine, as the merging lane, the lane defined by the outside division line and the central division line when at least one of a first angle and a second angle is equal to or greater than a predetermined value, the first angle being an angle formed between the arrow of the arrow marking the information of which is extracted by the processor and an extending direction of the outside division line, and the second angle being an angle formed between the arrow of the arrow marking the information of which is extracted by the processor and an extending direction of the central division line.

With the above configuration, the lane reduction determination device can restrain a false determination and can determine the lane to be reduced more accurately.

In the above aspect, the processor may be configured to output a result of determining.

What is claimed is:

1. A lane determination device comprising a processor configured to:
    store map information including information on division lines defining two lanes on a road;
    calculate a first angle and a second angle based on the map information, the first angle being a bending angle of a first division line at a junction where the two lanes merge together, the second angle being a bending angle of a second division line at the junction, the first division line being one of two outermost division lines in the division lines defining the two lanes, the second division line being the other one of the two outermost division lines; and
    determine, as a merging lane, a lane defined by the second division line out of the two lanes when the first angle is larger than the second angle,
    wherein the processor is configured to output a result of determining.

2. The lane determination device according to claim 1, wherein the processor is configured to determine, as the merging lane, the lane defined by the second division line out of the two lanes when the first angle is larger than the second angle and a difference between the first angle and the second angle is equal to or greater than a predetermined value.

3. The lane determination device according to claim 1, wherein the processor is configured to:
    employ, as the first angle, an angle equal to or less than 180 degrees from bending angles of the first division line at the junction; and
    employ, as the second angle, an angle equal to or less than 180 degrees from bending angles of the second division line at the junction.

4. A lane determination device comprising a processor configured to:
    store map information including information on division lines defining two lanes on a road and information on an arrow marking on the road which indicates a traveling direction of a vehicle merging at a junction where the two lanes merge together;

extract, based on the map information, information on an arrow marking provided between the junction and a point distanced from the junction by a predetermined distance in a predetermined direction, the predetermined direction being a direction from the junction toward the two lanes;

extract, based on the map information, information on two division lines defining a lane where the arrow marking is present; and determine, as a merging lane, a lane defined by an outside division line and a central division line when an arrow of the arrow marking, the information of which is extracted by the processor, is directed from the outside division line to the central division line, the central division line being a division line provided between the two lanes out of the two division lines, the outside division line being the other one of the two division lines, wherein the processor is configured to output a result of determining.

5. The lane determination device according to claim 4, wherein the processor is configured to determine, as the merging lane, the lane defined by the outside division line and the central division line when at least one of a first angle and a second angle is equal to or greater than a predetermined value, the first angle being an angle formed between the arrow of the arrow marking the information of which is extracted by the processor and an extending direction of the outside division line, and the second angle being an angle formed between the arrow of the arrow marking the information of which is extracted by the processor and an extending direction of the central division line.

\* \* \* \* \*